United States Patent Office 3,790,651
Patented Feb. 5, 1974

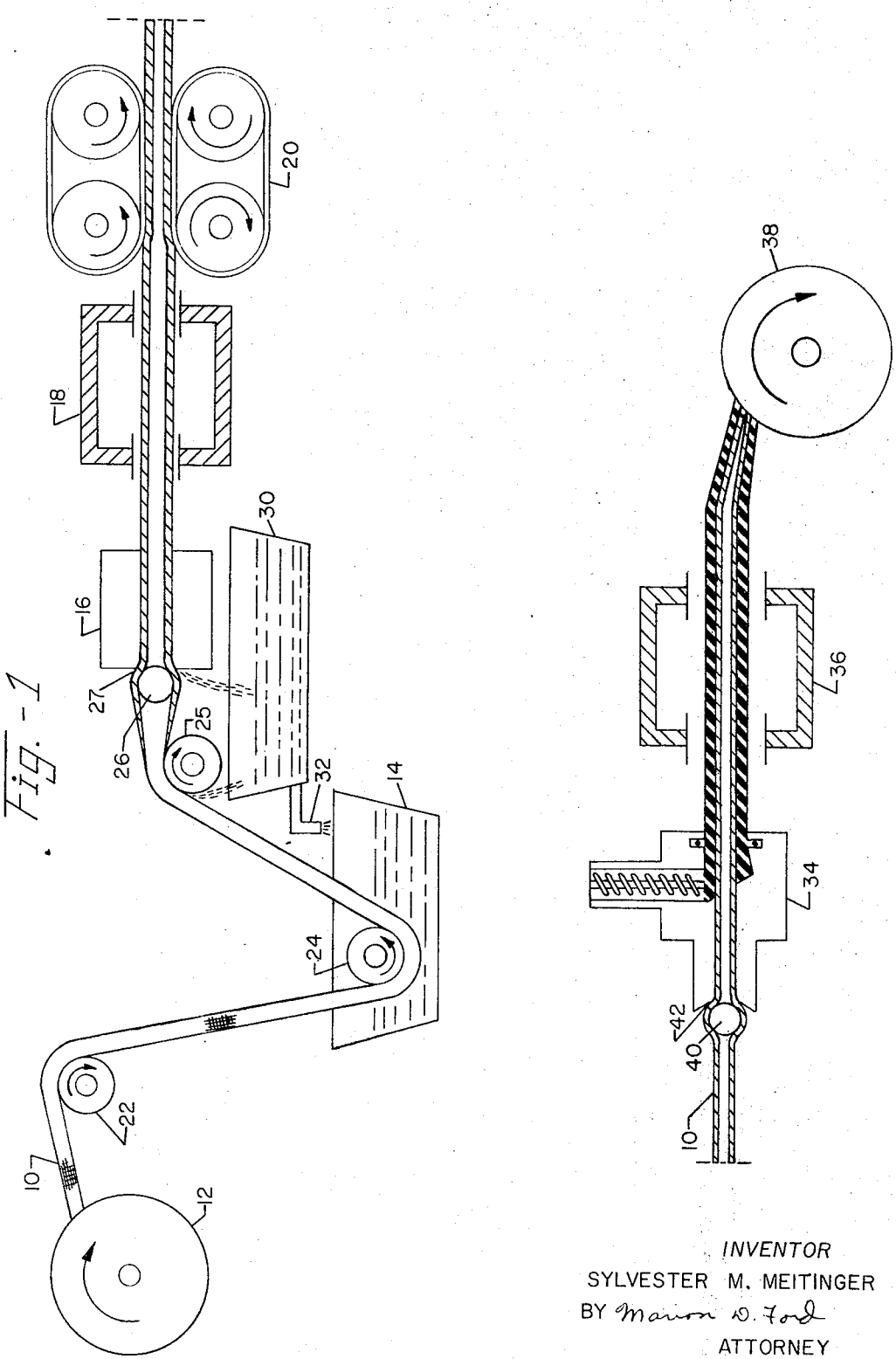

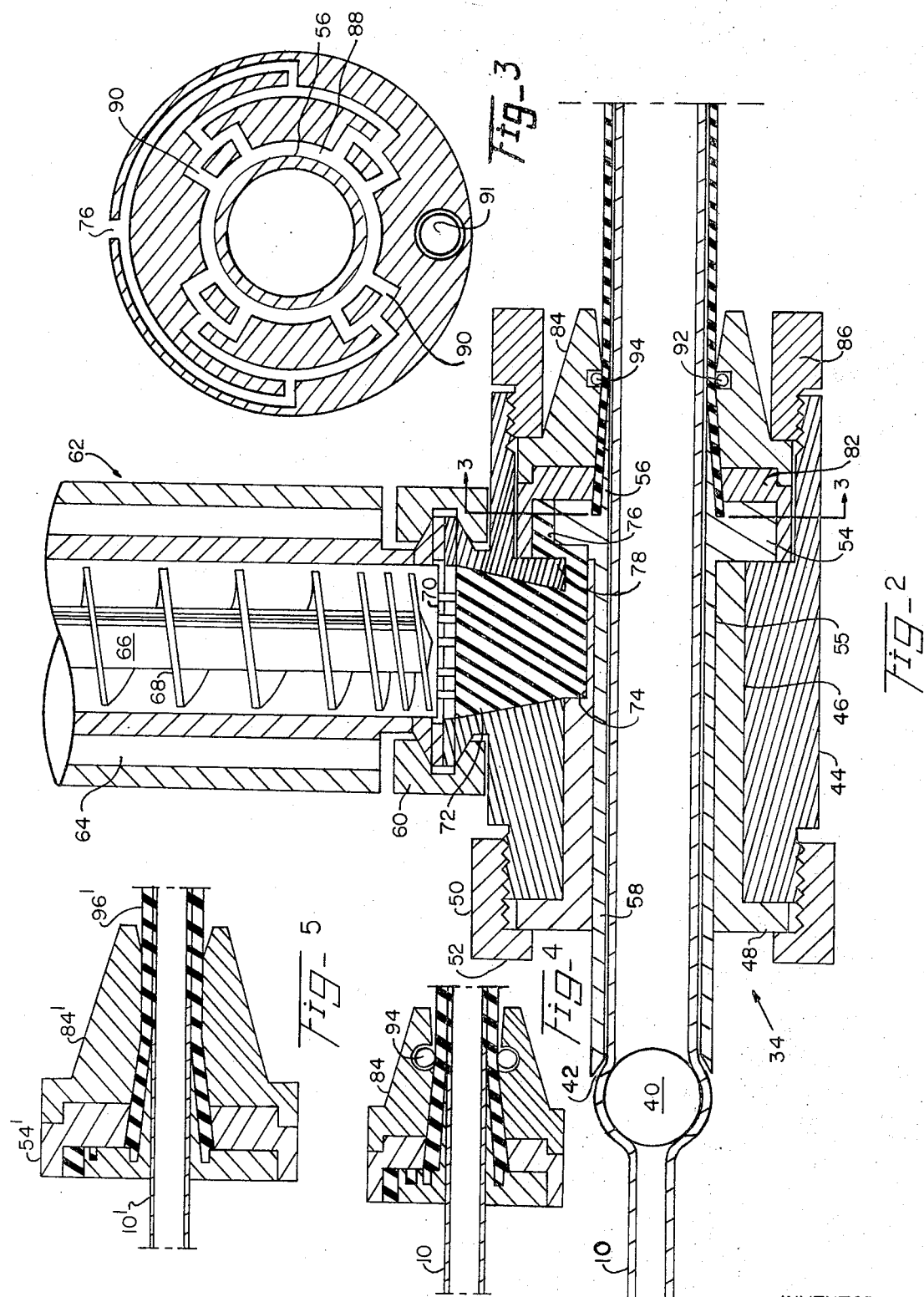

3,790,651
PROCESS FOR THE MANUFACTURE OF PLASTIC-COATED TUBULAR ARTICLES
Sylvester Martin Meitinger, Toledo, Ohio, assignor to Stauffer Chemical Company, New York, N.Y.
Continuation of abandoned application Ser. No. 862,102, July 7, 1969, which is a division of application Ser. No. 610,095, Jan. 18, 1967, now Patent No. 3,533,133, dated Oct. 13, 1970. This application Aug. 5, 1971, Ser. No. 169,499
Int. Cl. B29d 23/05
U.S. Cl. 264—135
4 Claims

ABSTRACT OF THE DISCLOSURE

Method of continuously applying a plastic coating to a tubular article, normally one which is not self-supporting. The said tubular article in flattened condition is passed over a ball means which coacts with an extrusion inlet to restore the flattened article into cylindrical configuration for coating of said tubular article. The plastic is formed as an annular stream into which the article is passed.

---

This application is a streamlined continuation of application Ser. No. 862,102, filed July 7, 1969 and now abandoned, which latter application was a division of application Ser. No. 610,095, filed Jan. 18, 1967, now U.S. Pat. No. 3,533,133, issued Oct. 13, 1970.

This invention relates to a process for applying a plastic coating to a tubular substrate.

The term "plastic" as used herein includes natural and synthetic resins and elastomers; also other materials which are capable of being extruded through a die or similar instrumentality. In most instances, the plastic material is required to be cured or set following application of the same to the substrate The invention is especially applicable where the tubular article coated or covered is of a fibrous nature. Such a tube is most frequently of braided construction, but may be knitted, woven or even felted. The fibrous material may be of mineral derivation as glass or asbestos, for example, or it may be of animal or vegetable origin, e.g., wool, cotton, ramie, etc. Additionally, synthetic fibrous or filamented materials, such as nylon and rayon, have application to the invention.

In general, it is contemplated that the tubular article subjected to the coating operation is so flexible and supple as not to be self-supporting.

Heretofore, plastic coatings have been applied to fibrous tubing or sleeving using a dipping process. Such process is extremely time-consuming, particularly in that repeated dippings are usually required in order to build up a coating of the proper thickness. Apart from this, it is difficult to satisfactorily control the cross-sectional shape of the coated tube and to achieve a coating of uniform thickness.

The present invention has as its principal object to provide a method whereby the fibrous or other tubing is uniformly coated in a speedy, continuous manner.

Another object is a system which is subject to substantially complete automation.

Still other objects and features of the invention will be apparent from the following description of a preferred embodiment thereof. The description will proceed with reference to the accompanying drawings wherein FIG. 1 diagrammatically illustrates the over-all system;

FIG. 2 shows in section a die assembly used in the system;

FIG. 3 is a view on the line 3—3 in FIG. 2; and

FIGS. 4 and 5 are sectional details, FIG. 5 being a modification.

Referring first to FIG. 1, it will be seen that the tubing or sleeving 10 to be coated is derived from a reel 12. The tubing is drawn, respectively, through a primary bath 14, a squeeze block 16 and an oven 18 by a capstan 20. From the reel 12, the tubing 10 will be observed as passing about an idler 22, thence under an idler 24 in the bath 14 and, thereafter, over an idler 25 into the squeeze block 16.

A ball 26 disposed within the tubing and having a diameter greater than the passageway through the block 16 coacts with an abutment 27 provided by said block to remove primer solution from the tubing. The removed solution is caught by receptacle 30 which communicates via a pipe 32 with the vessel 14.

The oven or evaporator 18 is maintained at a temperature such that essentially the last vestige of solvent is removed from the tubing.

Upon leaving the oven, the dry, primed tubing is sequentially passed through a die assembly 34 and a curing oven 36. Powered reel 38 is operated in timed relation with respect to the capstan 20, so that the tension on the tubing is substantially constant.

A second ball 40 within the primed tubing 10 coacts with an abutment 42 forming part of die assembly 34 to restore the tubing to cylindrical form, the same having been flattened incident to its passage through the capstan 20.

Going now to FIG. 2 of the drawing, it will be observed that the die assembly 34 comprises a generally cylindrical housing or casing 44. Centered within this housing member is an adapter 46 having an integral annular flange 48 whereby it is locked to the housing member by means of a nut 50. Such nut has a flange 52, which will be seen as abutting the flange 48.

Rightward of the adapter 46 is disposed the body portion 54 of a die element 55 which further includes a tapered, hollow boss 56 and an elongated tubular portion 58. It is the tubular portion 58 of the die element which provides the abutment 42 coacting with the ball 40 to restore the primed tubing 10 to a cylindrical form.

Upward of the casing 44 and secured thereto by means of a clamp collar 60 is a feed screw assembly 62. As shown, the casing of such assembly is formed to provide a passage 64 for the circulation of coolant or heating fluid, when needed. The thread 68 of screw 66 is desirably formed with a reduced pitch at the lower end of the screw to the end of attaining a compressive effect. Screen 70 serves to prevent the entry into the die assembly of any lumps which may be contained in the plastic feed stock.

Housing 44 is to be seen as having a tapered bore 72 receiving plastic from the screw assembly. The bore 72 communicates with a groove 74 cut in the wall of the adapter 46. This groove (74) communicates with a peripheral port 76 (FIG. 3) in the body portion 54 of the die element 55 via radial groove 78 located in the left face of such portion 54.

The body portion 54 of the die element 55 nests within an adapter 82 located by a plug 84 held in place by a nut 86 threaded into the housing 44.

From FIG. 3, it will be noted that the right face of the body portion 54 of the die element 55 is channeled to the end that the stream of plastic entering through the port 76 is divided and subdivided to an extent such that the annular groove 88 surrounding the boss 56 is served by no less than eight passages 90. This assures that the annular groove 88 will at all times be completely and uniformly filled with the plastic being applied to the tubing 10.

The arcuate channels in the die element 55 (FIG. 3) are closed by the adapter 82, which tightly abuts the right face of the portion 54. Annular groove 88, on the other hand, opens to an annular tapered passage provided by the boss portion 56 of the die element 55 together with the adapter 82 and the plug 84, which are supplied with registering apertures tapered in a manner complementary to the tapering of the boss portion 56.

Aperture 91 (FIG. 3), not shown in FIG. 2, accomodates a pilot pin carried by the adapter 82 at the inner face thereof.

An annular recess 92 in plug 84 is for the accommodation of an O-ring 94. Such O-ring has a diameter, before installation, less than that of the primed tubing 10. Hence, it exerts a constrictive force on the plastic as it leaves the end of the annular or tubular passage. The plastic material is thus firmly bonded to the primed tube 10 and where such tube is formed of a fibrous or other material having interstices, a portion of the plastic becomes embedded in the body of the tubing as illustrated by FIG. 4 in which the numerals employed correspond to those used to denote like parts in FIG. 2.

In the modification of FIG. 5 wherein similar numerals are employed, these, however, being primed, the plug 84 in lieu of an O-ring has an annular land 96 formed internally thereof to provide the constrictive effect securing the bond between the plastic and tubing.

Although the operation of the die assembly (FIG. 2) is surely apparent from the foregoing, a brief summary thereof may be in order. As before stated, the ball 40, which is advantageously formed of Teflon, functions with the abutment 42 to restore the primed tube 10 to its cylindrical form. As the tube travels through the tubular chamber delineated by the die element 55, the screw 66 forces the plastic material through the screen 70, thence through the passages 72, 74 and 78 into and through the closed die channels (FIG. 3). There is thus produced a tubular stream of plastic corresponding in initial diameter to that of the annular groove 88. The speed at which the annular stream travels the tapered passage about the boss 56 substantially corresponds to the rate of movement of the primed tube, which makes contact with the annular stream at a highly acute angle just inward of the constricting O-ring.

Modifications other than the modification herein described may be made, of course, without departure from the invention, the scope of which is set by the accompanying claims.

The invention claimed is:

1. A method of applying a plastic material to a tubular article which comprises continuously drawing a flattened tubular article over a ball means which is internal to said tubular article and has a diameter greater than the inlet of an extrusion device and coacts with said inlet to restore the flattened tubular article to a cylindrical configuration, drawing the tubular article through the extrusion device at a substantially constant predetermined rate without any internal support within said extrusion device, continuously introducing a single stream of the plastic material into said device at a rate synchronized with respect to the rate of introduction of the tubular article thereinto, subdividing said stream within said device into two streams and further subdividing said streams into a plurality of streams, converting said plurality of streams into a single tubular stream moving in the direction of said tubular article and enveloping the same, continuously depositing said tubular stream on and about said tubular article to form a coating thereon, said stream and said article forming an angle of less than 90° between the direction of movement of the article and the tubular stream at their point of contact and subjecting the coated article within said device to a radial constricting force operating to secure the bond between the plastic and the article.

2. The method of claim 1 wherein the tubular article is first treated with a primer solution, dried, and passed to the extrusion device in a flattened condition and thereafter being restored to a cylindrical form prior to being drawn through the extrusion device.

3. The method of claim 1 wherein the flexible tubular article is formed of a braided fibrous material and sufficient constrictive force is applied to the plastic coating to cause a portion of the plastic to be embedded in the body of the article.

4. The method of claim 1 wherein the tubular stream becomes progressively reduced in diameter as it approaches its point of contact with the said article.

References Cited
UNITED STATES PATENTS

| | | | |
|---|---|---|---|
| 2,324,645 | 7/1943 | Prehler | 264—136 |
| 3,106,748 | 10/1963 | Skobel | 264—173 |
| 3,159,877 | 12/1964 | Orsini | 425—113 |
| 3,359,357 | 12/1967 | Bentley, Jr. et al. | 264—173 |
| 3,249,666 | 5/1966 | French | 264—174 |
| 3,183,135 | 5/1965 | Berquist | 264—174 |
| 2,838,799 | 6/1958 | Meister | 264—95 |

ROBERT F. WHITE, Primary Examiner

J. R. THURLOW, Assistant Examiner

U.S. Cl. X.R.

264—136, 137, 173, 209, 273, 275